United States Patent [19]
Dooley et al.

[11] 4,438,872
[45] * Mar. 27, 1984

[54] DISPENSING APPARATUS

[76] Inventors: Dan W. Dooley, 6182 W. Dawn St.; Robert T. Bromps, 6239 SW. Edgewood, both of Lake Oswego, Oreg. 97034

[*] Notice: The portion of the term of this patent subsequent to Dec. 15, 1998 has been disclaimed.

[21] Appl. No.: 285,388

[22] Filed: Jul. 20, 1981

[51] Int. Cl.³ .................... G01F 11/06; B65D 88/54
[52] U.S. Cl. ................... 222/217; 222/263; 222/288; 222/334; 91/217; 92/51; 92/117 A; 417/392
[58] Field of Search .............. 222/249, 250, 253, 263, 222/282, 286, 338, 389, 334, 361, 288, 251, 216, 222/217; 417/392; 91/224, 217, 422, 437; 92/117 R, 92/117 A, 51, 52, 181 P, 183; 251/51

[56] References Cited

U.S. PATENT DOCUMENTS 3,216,627 11/1965 Best et al. ...................... 222/249
3,599,839 8/1971 Hansen ....................... 222/250 X
4,305,531 12/1981 Dooley et al. ................ 222/389 X
4,342,634 8/1982 Haasl et al. .................... 91/422 X Primary Examiner—David A. Scherbel
Assistant Examiner—Russell D. Stormer
Attorney, Agent, or Firm—James D. Givnan, Jr.

[57] ABSTRACT

Apparatus for repeatedly dispensing measured portions of viscous substances is disclosed. The invention includes a body defining a bore within which is a sleeve defined floating measuring chamber. In the chamber is a sliding piston. Material to be dispensed is forced into the floating measuring chamber under pressure. A three-way, two-position air valve actuates the dispensing apparatus. Shifting of the air valve applies air pressure to one end of the floating measuring chamber, causing it to shift. This closes a material supply port and opens a material discharge port. The floating measuring chamber meters the flow of air to the floating piston so that the discharge velocity of the material being dispensed is controlled. At the end of the dispensing cycle, air under pressure is directed out through the material discharge port clearing it of residual material.

3 Claims, 2 Drawing Figures

DISPENSING APPARATUS

BACKGROUND OF THE INVENTION

1. Field of the Invention

The invention pertains to dispensing systems in general, and more particularly to systems for the dispensing of viscous or semi-solid materials.

Description of the Prior Art

Conventional dispensing systems for liquids generally comprise a pressurized supply and a dispensing valve. The valve is opened for a pre-determined period of time, to dispense a pre-determined quantity of liquid. Such systems are not entirely satisfactory for use with viscous substances such as syrups, custards, jellies, or materials which contain semi-solid elements. The quantity of material dispensed in a given time may vary. Shutoff of the dispensing valve may be difficult. U.S. Pat. No. 4,305,531, issued Dec. 15, 1981 to the present inventors and co-pending with the present application, discloses a dispensing apparatus with an open ended sleeve with no provision in the sleeve structure for metering air to or from the sleeve interior.

SUMMARY OF THE INVENTION

The present invention includes a body defining a cylindrical bore and containing a hollow, floating sleeve defining a, measuring chamber which has a slideable dispensing piston. The body and measuring chamber each have a supply port and a discharge port. One end of the floating chamber is closed by a plug which defines an orifice and includes a check valve. The floating sleeve and the dispensing piston are actuated by compressed air directed through a three-way, two-position air valve. Compressed air forces the material to be dispensed into the floating sleeve chamber. Further actuation of the air valve moves the measuring chamber, closes the intake port, opens the discharge port, and causes the dispensing piston to slide within the measuring chamber to force the viscous material out through the discharge port.

A principal object of the invention is to provide improved apparatus for repeatedly dispensing a pre-determined quantity of viscous substances at a desired rate.

A further object of the invention is to provide dispensing apparatus which includes positive control of the discharge velocity of the materials being dispensed.

A further object of the invention is to provide dispensing apparatus which eliminates the after drip commonly associated with previously known dispensing systems.

Further objects and advantages of the invention will be apparent to those skilled in the art, by reference to the accompanying drawing and detailed description.

DETAILED DESCRIPTION OF THE PREFERRED EMBODIMENT

Figure 1:
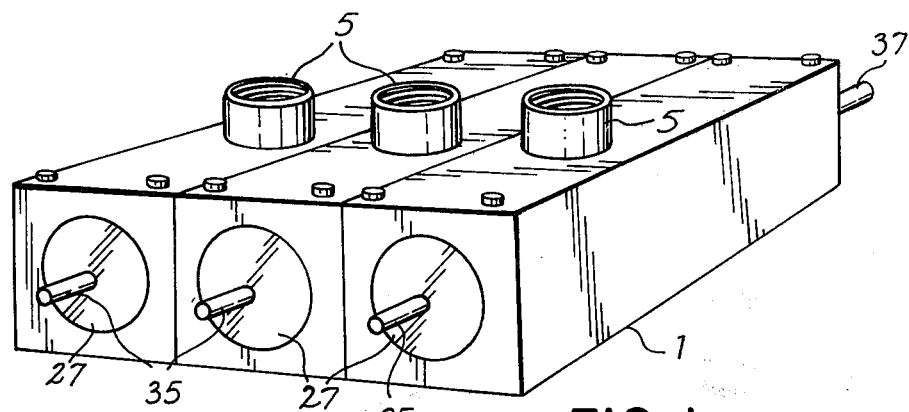
FIG. 1 is a perspective view of an array dispensing elements according to the present invention.

Referring now to the drawings, a body 1 defines a bore 3, an inlet port 5 and an outlet port 7. Ports 5 and 7 are separate elements and are held in place by pins 9 and 11, respectively. Within body 1 is a floating sleeve 13 defining a measuring chamber which defines annular O-ring grooves 15, 17 and 19, into which are inserted O-rings 21 for sealing. Sleeve 13 also defines inlet port 23 and outlet port 25. End caps 27 and 29 define O-ring grooves 31 which contain O-rings 33. End caps 27 and 29 close the ends of body 1. Caps 27 and 29 further include air inlet ports 35 and 37, respectively. Sleeve 13 is closed at one end by plug 39 which is loaded by spring 41. Sleeve 13 is further closed at its opposite end with a plug 43 which defines metering orifice 45 and a check valve 47 comprised of ball 49 and spring 51 and retainer 53. Ball 49 is unseated to permit rapid exhausting of air from the sleeve chamber rearward of the piston during filling of the sleeve with pressurized material Within floating sleeve 13 is a slideable piston 55, having O-ring grooves 57 and 59 within which are O-rings 61 to provide sealing. A supply tank 63 charged with viscous material is connected to inlet port 5 by means of conduit 65, and to an air supply 67 by conduit 69. A standard three-way, two-position air control valve 71 is operatively connected to air supply 67 by line 73, to port 35 by line 75, and to port 37 by a line 77.

OPERATION OF THE INVENTION

Material to be dispensed is placed in tank 63. Compressed air from source 67 to tank 63 forces material through conduit 65 into inlet port 5 and port 23 into floating sleeve 13. This material moves against the face of piston 55 to seat same against plug 43.

Shifting of air valve 73 to an activating position directs compressed air through tubular conduit 75, through port 35, against the face of check valve equipped plug 43. Air pressure against the face of plug 45 will force the filled floating sleeve 13 to move against load spring 41, causing it to compress.

With air control valve 71 in its active position, no air under pressure exists in line 77.

Air in bore 3 will exhaust into discharge port 7 as floating sleeve 13 compresses spring 41. Movement of sleeve 13 shears any material between port 5 and port 23. Port 23 moves past port 5 and seals the port, preventing further flow of material into sleeve 13. With ports 25 and 7 aligned, air through orifice 45 in sleeve plug 43 forces piston 55 against the material in sleeve 13 discharging it out through port 25 and port 7.

Discharge velocity of the material being dispensed is controlled by the size of orifice 45 in sleeve end plug 43 which may be interchanged with like plugs having smaller or larger orifices.

Discharge volume of the material being dispensed is controlled by the length of piston 55 which is interchangeable with like pistons of different lengths. It is readily apparent that pistons of various length could be used within chamber 13 to vary the effective volume of sleeve 13 and hence the quantity of material dispensed.

Figure 2:
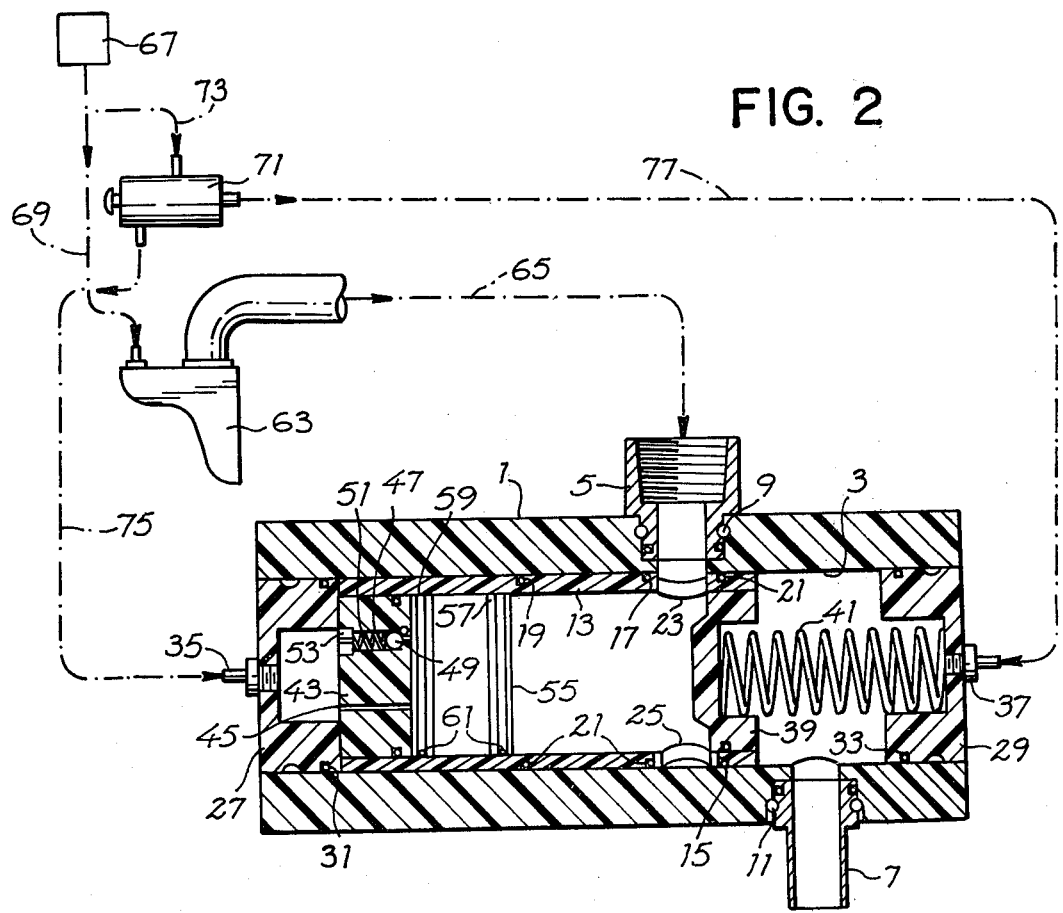
FIG. 2 is a cross-sectional elevation of the dispensing apparatus of the present invention.

Shifting of air valve 71 back to its rest position opens a path for air between check valve plug 43 and the back surface of piston 55 to escape through port 35. This air exits through conduit 75, through valve 71 and into conduit 77, where it is directed through port 37 into body bore 3 containing load spring 41. This air assists load spring 41 in returning floating sleeve 13 to its original position per FIG. 2.

As measuring chamber 13 returns to its original position, port 25 shears any residual material at the upper surface of port 7. Port 7 is now open to the air charge previously introduced into bore 3 which now exhausts via port 7. This air exhausts through port 7 and clears away any residual material. Port 23 is now in communication with port 5 and new material from dispenser 23 enters sleeve 13. Entry of new material into sleeve 13 shifts piston 55 backward towards check valve plug 43 and further forces the residual air between the face side of plug 43 and the back side of piston 7 out through orifice 45, and check valve 49. The check valve allows faster exhaust of air than would be possible through flow of air through orifice 45 alone. Rapid refilling of measuring chamber 13 is thus possible. When piston 55 bottoms against check valve plug 45, floating sleeve 13 is filled and ready for a new cycle. Shifting of air valve 71 initiates a new cycle and the sequence of events described above is repeated.

Having disclosed our invention through the accompanying drawing and described its construction and operation in detail, it will be apparent to those skilled in the art that many modifications can be made without departing from the true spirit and scope of the appended claims. We claim as our invention all such modifications as fall within the scope of the following claims:

We claim:

1. A dispensing apparatus for pressurized viscous material and comprising,
    an elongate body including end caps and defining a bore, said end caps each defining an air inlet port,
    a sleeve slidably disposed within the bore and defining a chamber closed at its ends by a first plug and a second plug,
    biasing means interposed between said second sleeve plug and an end cap of the elongate body to bias the sleeve to a loading position,
    a piston within said sleeve,
    a material inlet port on the body,
    said sleeve defining an inlet port registerable with said inlet port on the body for the admission of pressurized material into said sleeve,
    a material outlet port on said body,
    said sleeve defining a discharge port registerable with said material outlet port on said body,
    valve means in communication with a source of pressurized air and the air inlet port in said end caps and manually operable to alternately direct pressure via said end caps to the ends of said body defined bore, and
    said first plug of the sleeve including a metering orifice for the admission of air in a metered manner to act on the piston within said sleeve to urge the sleeve to a discharge position and the piston along said sleeve to discharge sleeve contents.

2. The dispensing apparatus claimed in claim 1 wherein said first plug additionally includes a check valve permitting passage of air outwardly of said sleeve to increase the return speed of the piston under the influence of the pressurized viscous material entering said sleeve.

3. The dispensing apparatus claimed in claim 1 wherein one of said end caps is removably mounted on said elongate body, one of said plugs is removably mounted on said sleeve to permit disassembly and substitution of sleeve components to vary the rate and the amount of dispensed material.

* * * * *